US006651080B1

(12) United States Patent
Liang et al.

(10) Patent No.: US 6,651,080 B1
(45) Date of Patent: Nov. 18, 2003

(54) TECHNIQUES FOR IMPLEMENTING PLUGGABLE VIRTUAL MACHINES

(75) Inventors: Sheng Liang, Mountain View, CA (US); Timothy G. Lindholm, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/216,020

(22) Filed: Dec. 16, 1998

Related U.S. Application Data (60) Provisional application No. 60/104,619, filed on Oct. 16, 1998.

(51) Int. Cl.[7] .............................................. G06F 17/00
(52) U.S. Cl. ......................... 709/1; 709/331; 709/332; 717/148; 717/162; 717/163; 717/164; 717/165; 717/166
(58) Field of Search ................................. 709/331, 332; 717/148, 162–166

(56) References Cited

U.S. PATENT DOCUMENTS

| | | | | |
|---|---|---|---|---|
| 5,946,487 A | * | 8/1999 | Dangelo ..................... | 717/148 |
| 5,983,021 A | * | 11/1999 | Mitrovic .................... | 717/158 |
| 5,999,988 A | * | 12/1999 | Pelegri-Llopart et al. ... | 709/304 |
| 6,202,205 B1 | * | 3/2001 | Saboff et al. ............... | 717/151 |
| 6,219,825 B1 | * | 4/2001 | Burch et al. ................ | 717/158 |
| 6,272,677 B1 | * | 8/2001 | Lam ........................... | 717/11 |
| 6,363,436 B1 | * | 3/2002 | Hagy et al. ................. | 709/331 |
| 6,546,551 B1 | * | 4/2003 | Sweeney et al. ............ | 717/154 |

OTHER PUBLICATIONS

Bertrand Meyer, "Object–Oriented Software Construction", Prentice Hall PTR, Second Edition, pp. 39–41, and 50, 67–74, 109–110, 494–498.*
Douglas Kramer, "The Java Platform A white Paper", May 1996, p. 1–27.*

* cited by examiner

*Primary Examiner*—Phuong N. Hoang
*Assistant Examiner*—John Follansbee
(74) *Attorney, Agent, or Firm*—Beyer Weaver & Thomas, LLP (57) ABSTRACT

Techniques for developing and exchanging virtual machine implementations and/or support library implementations are described. In one embodiment, the virtual machine design specifies a set of functions for executing all or substantially all support library operations that are dependent on the implementation of the virtual machine. When a developer desires to substitute one virtual machine implementation for another, the developer is able to basically "plug-in" the second virtual machine implementation with minimal impact on the support libraries since both virtual machine implementations provide implementations for the set of specified functions that are dependent on the implementation of the respective virtual machine. Conversely, different support libraries may be utilized in conjunction with a particular virtual machine implementation.

21 Claims, 7 Drawing Sheets

TECHNIQUES FOR IMPLEMENTING PLUGGABLE VIRTUAL MACHINES

This application claims the benefit of provisional application No. 60/104,619, filed Oct. 16, 1998.

BACKGROUND OF THE INVENTION

The present invention relates generally to techniques for developing and delivering virtual machine implementations. More specifically, the invention relates to techniques for creating virtual machine implementations that may be exchanged without requiring modification of the supporting libraries.

The Java™ programming language is an object-based high level programming language developed by Sun Microsystems, Inc. of Palo Alto, Calif., and is designed to be portable enough to be executed on a wide range of computers ranging from small devices (e.g., pagers, cell phones and smart cards) up to supercomputers. Computer programs written in the Java programming language (and other languages) may be compiled into Java virtual machine instructions for execution by a Java virtual machine implementation. In the abstract, a virtual machine interprets virtual machine instructions. That is, the virtual machine decodes and executes the virtual machine instructions. Thus, the Java virtual machine interprets Java virtual machine instructions.

The Java virtual machine is commonly implemented in software by means of an interpreter for the Java virtual machine instruction set, but in general may be software, hardware, or both. Conventional virtual machine interpreters decode and execute the virtual machine instructions of an interpreted program one instruction at a time during execution, e.g., "at runtime," which is in contrast to compilers that decode source code into native machine instructions prior to execution, e.g., "at compile time," so that decoding is not performed during execution. Typically, the Java virtual machine implementation and support libraries, which together constitute the Java™ runtime environment, will be written at least in part in a programming language other than the Java programming language (e.g., the C++ programming language).

Computer programs in the Java programming language are arranged in one or ore classes or interfaces (referred to herein jointly as classes). Such programs are generally platform, i.e., hardware and operating system, independent. As such, these computer programs may be executed, unmodified, on any computer that is able to run an implementation of the Java™ runtime environment. A class written in the Java programming language is compiled to a particular binary format called the "class file format" that includes Java virtual machine instructions for the methods of a single class. In addition to the Java virtual machine instructions for the methods of a class, the class file format includes a symbol table as well as other ancillary information associated with the class.

Figure 5:
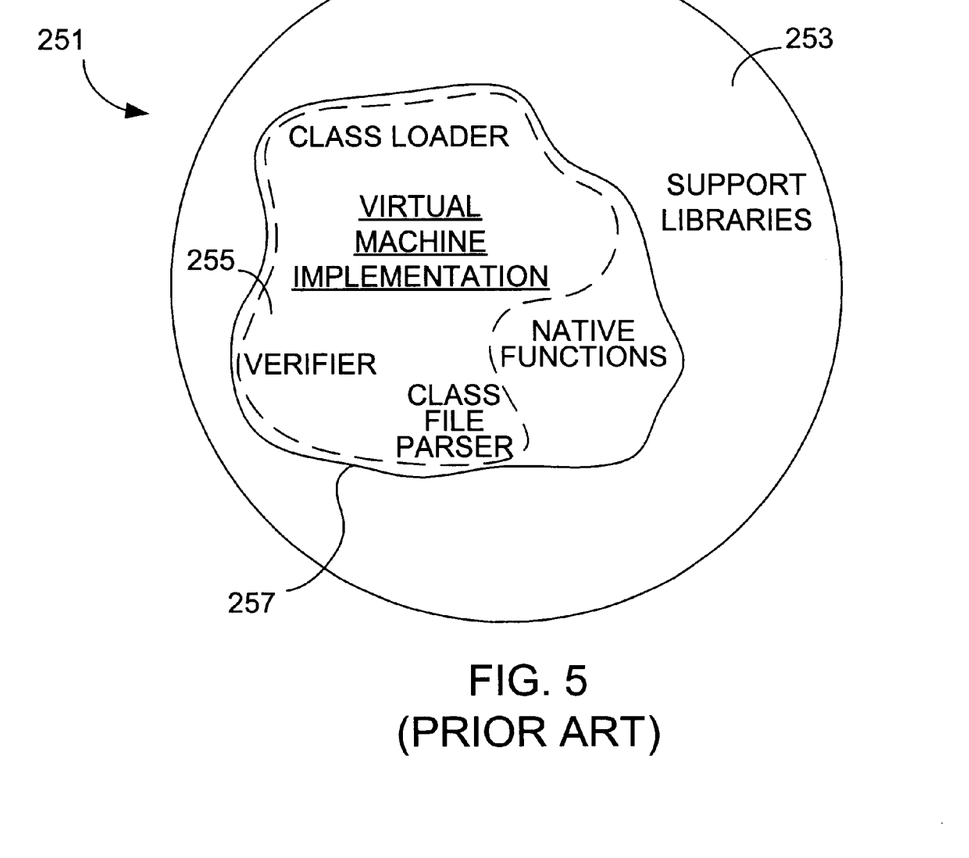
FIG. 5 illustrates a conventional Java virtual machine implementation.

A conceptual view of a conventional implementation of the Java runtime environment is shown in FIG. 5. As seen therein, the Java runtime environment 251 includes support libraries 253 and executable program 257 incorporating a Java virtual machine implementation 255. Support libraries 253 are also known as built-in or standard class libraries. Support libraries 253 include Java methods that may be implemented through the use of native functions. Such native functions may be delivered, in addition to Java virtual machine implementation 255, as part of executable program 257. The native functions in executable program 257 typically include functions for controlling the virtual machine and for providing platform specific functions like I/O, graphical windowing, networking, and the like. It should be appreciated that the native functions may be written in any number of different languages and are typically written in a language other than the Java programming language.

Java virtual machine implementation 255 also includes a class loader and a verifier. There is typically no clear interface between the class loader or class verifier portions of a Java virtual machine implementation and the remainder of that virtual machine implementation. Similarly, there is typically no clear interface between the native functions and the virtual machine implementation because the various components of the Java runtime environment may be designed at the same time. Accordingly, the class loader, verifier, and native functions may be written with assumptions about the Java virtual machine implementation. For example, they may be written to utilize specific data structures used within the Java virtual machine implementation. If a developer desires to change the Java virtual machine implementation, a substantial amount of time may be required to rewrite or modify the class loader, verifier, and native functions to work with the new Java virtual machine implementation.

The support libraries 253 may also include additional native functions or other methods that are at least partially dependent on the specific implementation of the Java virtual machine utilized in the Java runtime environment. For example, many operations that the support libraries perform require access to data structures managed by the Java virtual machine or services provided by the Java virtual machine (e.g., threads). In conventional implementations this significantly limits the modularity of the support libraries since any class library that includes an implementation dependent function would potentially have to be rewritten or modified to accommodate a new Java virtual machine implementation.

It view of the foregoing, it would generally be desirable to provide a modular runtime environment architecture where the functionality provided by the support libraries may be shared by multiple virtual machine implementations. It would also be desirable to provide innovative techniques of developing and delivering virtual machine implementations that would allow virtual machines to be exchanged with essentially no impact on the support libraries. Conversely, it would be desirable to facilitate the exchange of support library implementations with essentially no impact on the virtual machine implementations.

SUMMARY OF THE INVENTION

In general, embodiments of the present invention provide innovative techniques for developing and exchanging virtual machine implementations and/or support library implementations. As an example, in one embodiment of the invention, the virtual machine design specifies a set of functions for executing all or substantially all support library operations that are dependent on the implementation of the virtual machine. When a developer desires to substitute one virtual machine implementation for another, the developer is able to basically "plug-in" the second virtual machine implementation with minimal impact on the support libraries since both virtual machine implementations provide implementations for the set of specified functions that are dependent on the implementation of the respective virtual machine. This allows the developer great flexibility in exchanging the virtual machine implementation. Several embodiments of the invention are described below.

In one embodiment, a method for developing virtual machine implementations includes providing an interface as part of the virtual machine design that specifies functions that may be called by functions which are part of the support library implementations. The set of functions that essentially make up the interface execute all or substantially all operations utilized by the support libraries that are dependent on the implementation of the virtual machine. The set of functions may include operations that control a virtual machine implementation, access data managed by the virtual machine, and perform input/output (I/O) operations.

As the interface specifying all or substantially all of the operations utilized by the support libraries that are dependent on the implementation of the virtual machine has been specified in the design of the virtual machine, the same implementation of the support libraries may be readily utilized by any of several implementations of the virtual machine. Accordingly, one of two virtual machine implementations may be easily replaced with the other. In other words, the virtual machine implementations may be considered to be "pluggable," e.g., interchangeable. In preferred embodiments, the virtual machine is a Java virtual machine and the interface is a binary interface, i.e., the virtual machine implementations are "binary pluggable."

In still another embodiment, a method for developing virtual machine implementations includes providing an interface as part of a support library design that specifies functions that may be called by functions which are part of both virtual machine implementations. The set of functions that effectively make up the interface execute operations utilized by the virtual machine implementation that may be supplied by the support libraries. The set of functions may include common utilities or critical code that would preferably not be duplicated.

Since the interface specifying operations used by a virtual machine implementation that are supplied by the support libraries have been specified in the design of the support libraries, the same implementation of a virtual machine may be readily utilized by any of several implementations of the support libraries. As such, one of two support library implementations may be easily replaced with the other, i.e., the support library implementations are "pluggable." In some embodiments, the support libraries are those of a Java runtime environment and the interface is a binary interface, i.e., the support library implementations are "binary pluggable."

Other features and advantages of the invention will become readily apparent upon review of the following detailed description in association with the accompanying drawings.

DESCRIPTION OF THE DRAWINGS

The present invention, in specific embodiments, may be understood by reference to the following description taken in conjunction with the accompanying drawings in which.

DESCRIPTION OF PREFERRED EMBODIMENTS

Definitions

Machine instruction—An instruction that directs a computer architecture to perform an operation; an instruction that is specified by an operation code (opcode) and optionally one or more operands.

Virtual machine instruction—A machine instruction for an abstract computer architecture, typically implemented by emulation or interpretation by a software program.

Native machine instruction—A machine instruction that is designed for a concrete computer architecture or microprocessor.

Class—An object-oriented data type that defines objects that share the same characteristics, typically including both data and methods that operate on the data.

Object (or class instance)—An instantiation of a class.

Function—A software routine (also called a subroutine, procedure, member function, and method).

Native functions—Functions that are written in a programming language other than the Java programming language Native methods—Methods that are declared in the Java programming language but that are implemented through the use of native functions.

Overview

In the description that follows, the present invention will at times be described in reference to preferred embodiments directed to the Java virtual machine and Java virtual machine implementations. In particular, examples will be described in which Java virtual machine implementations are developed or exchanged. However, the invention is not limited to any particular virtual machine, virtual machine implementation, programming language, computer architecture, or specific implementation. Specifically, virtual machines and virtual machine implementations are not necessarily Java virtual machines and Java virtual machine implementations. Therefore, the description of the embodiments that follow is for purposes of illustration and not limitation.

Figure 1:
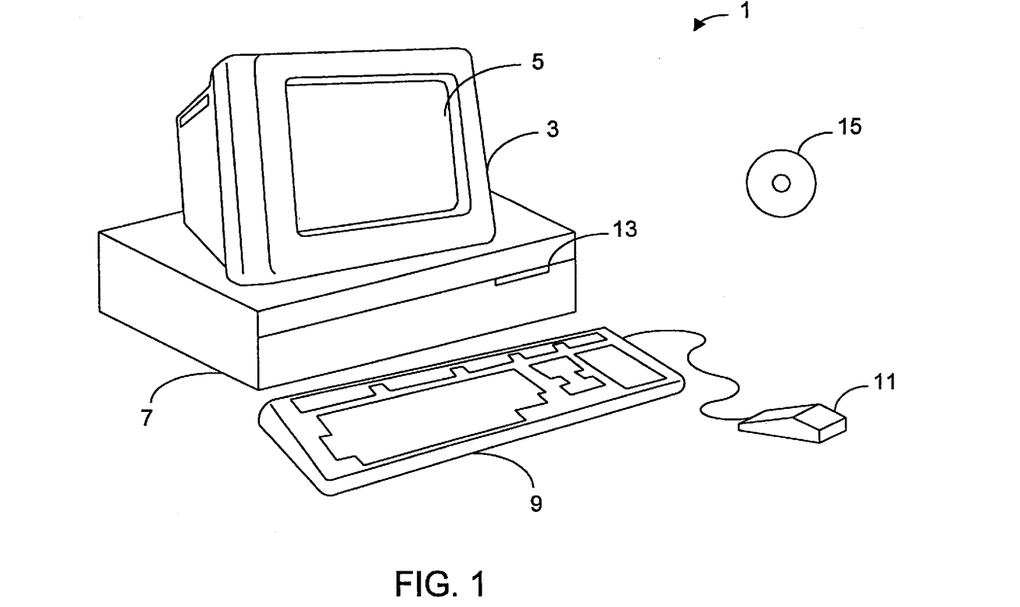
FIG. 1 illustrates an example of a computer system that may be utilized to execute the software of an embodiment of the invention.

FIG. 1 illustrates an example of a computer system that may be used to execute the software of an embodiment of the invention. FIG. 1 shows a computer system 1 that includes a display 3, screen 5, cabinet 7, keyboard 9, and mouse 11. Mouse 11 may have one or more buttons for interacting with a graphical user interface. Cabinet 7 houses a CD-ROM drive 13, system memory and a hard drive which may be utilized to store and retrieve software programs incorporating computer code that implements the invention, data for use with the invention, and the like. Although the CD-ROM 15 is shown as an exemplary computer readable storage medium, other computer readable storage media including floppy disk, tape, flash memory, system memory, and hard drive may be utilized. Additionally, a data signal embodied in a carrier wave (e.g., in a network including the Internet) may be the computer readable storage medium.

Figure 2:
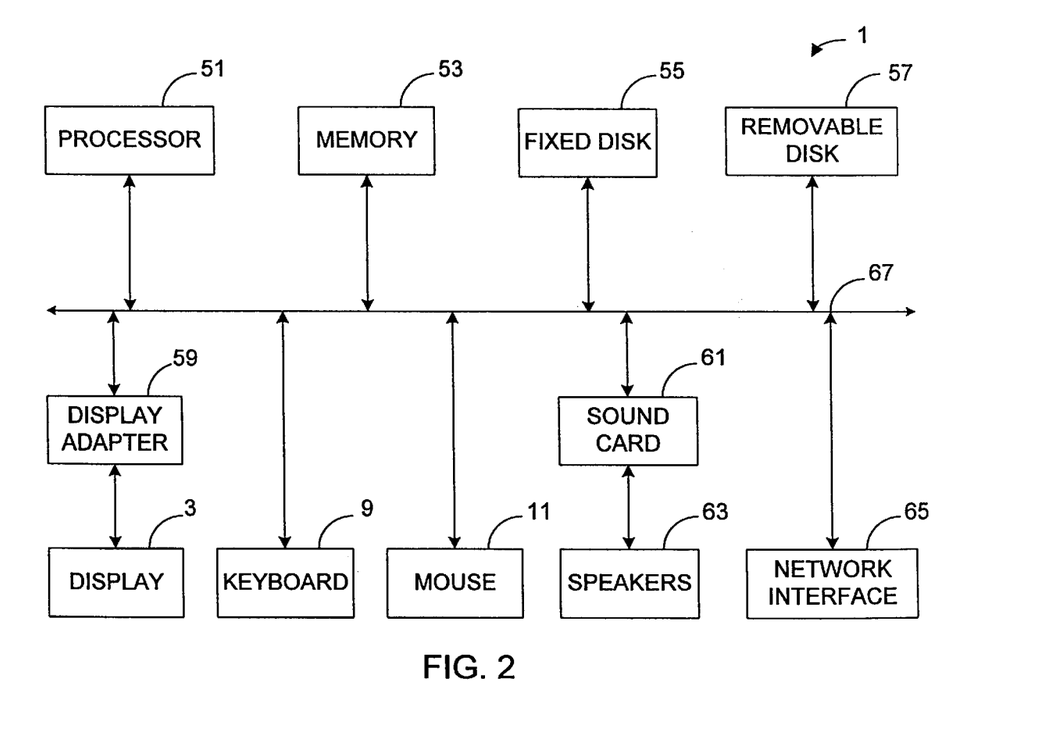
FIG. 2 shows a system block diagram of the computer system of FIG. 1.

FIG. 2 shows a system block diagram of computer system 1 used to execute the software of an embodiment of the invention. As in FIG. 1, computer system 1 includes monitor 3 and keyboard 9, and mouse 11. Computer system 1 further includes subsystems such as a central processor 51, system memory 53, fixed storage 55, removable storage 57 (e.g., CD-ROM drive), display adapter 59, sound card 61, speakers 63, and network interface 65. Other computer systems suitable for use with the invention may include additional or fewer subsystems. For example, another computer system could include more than one processor 51 (i.e., a multi-processor system), or a cache memory.

The system bus architecture of computer system 1 is represented by arrows 67. However, these arrows are illustrative of any interconnection scheme serving to link the subsystem. For example, a local bus could be utilized to connect the central processor to the system memory and display adapter. Computer system 1 shown in FIG. 2 is but an example of a computer system suitable for use with the invention. Other computer architectures having different configurations of subsystems may also be utilized.

Figure 3:
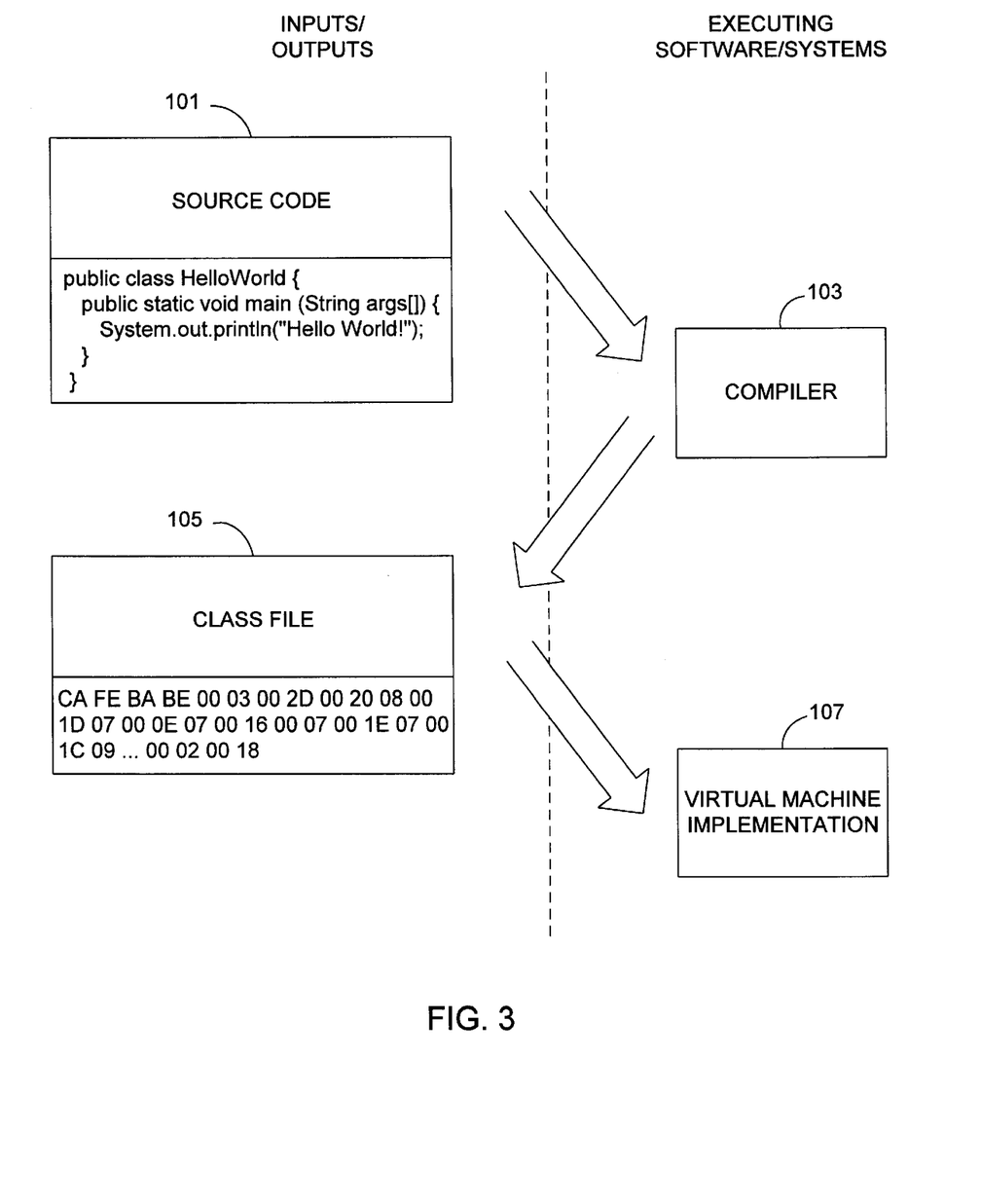
FIG. 3 shows how a Java source code program is executed.

Typically, computer programs written in the Java programming language are compiled into Java virtual machine instructions that are then executed by a Java virtual machine implementation. The virtual machine instructions are stored in a binary format known as the "class file format" that is input into the Java virtual machine implementation for execution. FIG. 3 shows a progression of a simple piece of source code through execution by a Java virtual machine implementation.

Source code 101 includes the classic "Hello World" program written in the Java programming language. The source code is then input into a compiler 103 for the Java programming language that compiles the source code into Java virtual machine instructions. The Java™ compiler outputs a class file 105 that includes the Java virtual machine instructions corresponding to source code 101. The Java virtual machine instructions will be executed by a Java virtual machine implementation.

Class file 105 is input into a Java virtual machine implementation 107. Java virtual machine implementation 107 decodes and executes the Java virtual machine instructions in the class file 105. Java virtual machine implementation 107 is typically an interpreter or a software emulator but may use other implementation techniques.

Figure 4:
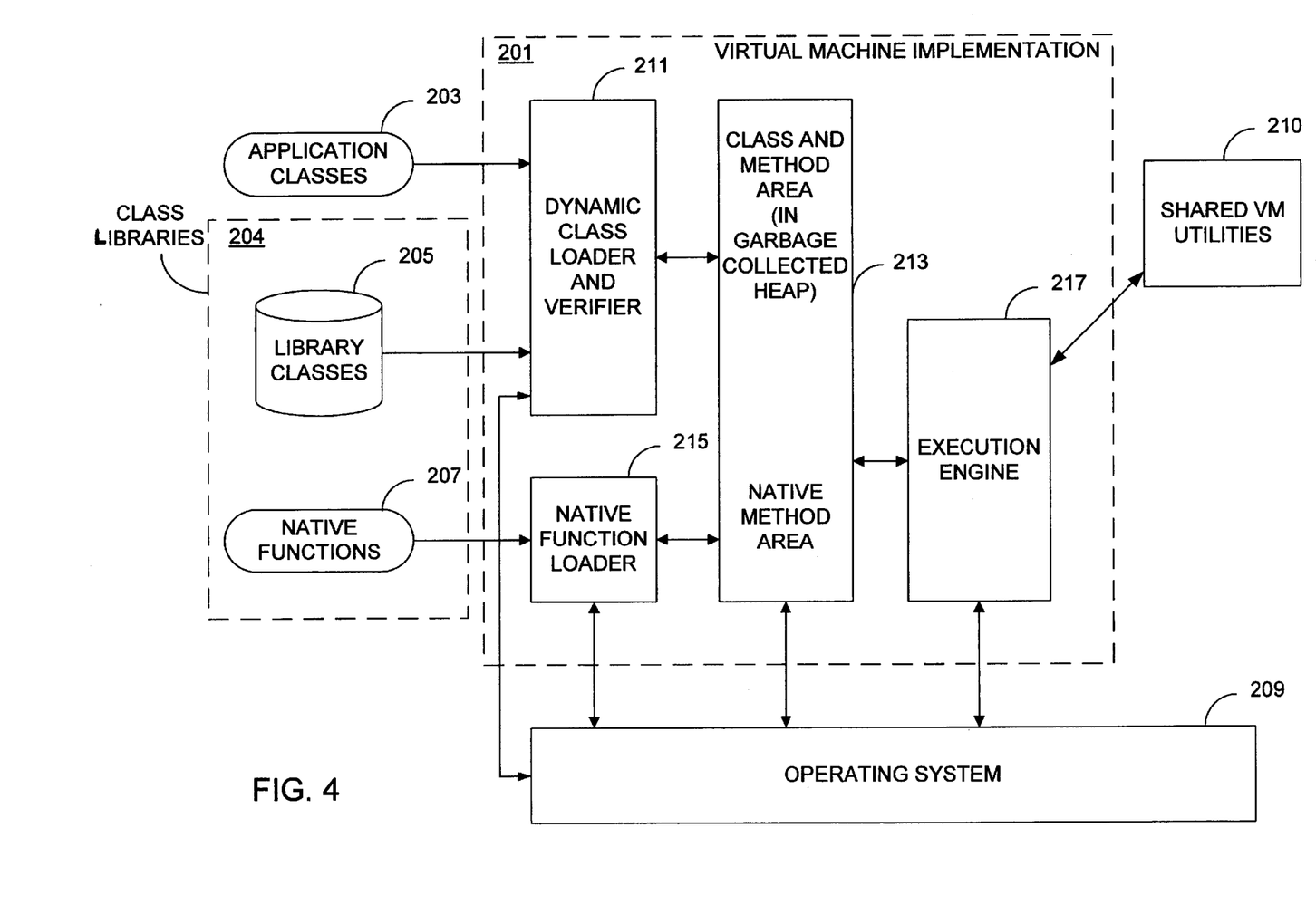
FIG. 4 shows the components of a Java virtual machine implementation.

FIG. 4 shows the components of a representative virtual machine implementation 201. The illustrated embodiment is a Java virtual machine implementation, although it could represent other virtual machine implementations as well. A variety of inputs may be made to the virtual machine implementation 201. By way of example, these inputs may take the form of application classes 203, library classes 205 and native functions 207. The application classes 203 typically constitute programs to be executed by the virtual machine implementation that have been compiled to virtual machine instructions. The library classes 205 are classes that provide a variety of services to the virtual machine implementation that may be useful or necessary to operate the virtual machine implementation and/or support its execution of received programs. The native functions 207 are functions necessary to support the library classes 205. The native functions are typically stored in dynamic-link libraries (DLLs) or shared libraries in a platform specific way. Conceptually, the library classes 205 and native functions 207 together are referred to herein as the class libraries 204.

The virtual machine implementation 201 may also interface with shared virtual machine utilities 210 and an operating system 209. The operating system may handle a number of primitive functions for the virtual machine implementation 201, as for example basic I/O functions. As will be described in more detail below, the shared virtual machine utilities 210 are dedicated functions that a virtual machine implementation 201 can count on to be present in the runtime environment to provide specific services.

The virtual machine implementation itself includes a dynamic class loader and verifier 211, a native function loader 215, memory 213 and execution engine 217. The dynamic class loader and verifier 211 loads application classes 203 and library classes 205 via operating system 209 into a memory 213. Additionally, the dynamic class loader and verifier 211 verifies the correctness of the virtual machine instructions in received application classes 203 and reports any errors that are detected during the verification.

A native function loader 215 loads in native functions 207 via operating system 209 into the virtual machine implementation and stores the loaded native functions 207 in memory 213. As shown, memory 213 may include a class and method area for classes and a native function area for native functions. The class and method area in memory 213 may be stored in a garbage-collected heap. As new objects are created, they are stored in the garbage-collected heap. The virtual machine implementation, not the application, is responsible for reclaiming memory in the garbage-collected heap when space is no longer being utilized.

At the heart of the Java virtual machine implementation shown in FIG. 4 is an execution engine 217. The execution engine carries out the instructions stored in memory 213 and may be implemented in software, hardware or a combination of the two. The execution engine supports programs written using the virtual machine instruction set and conceptually there may be multiple execution engines running concurrently, one for each thread of control. The operation of virtual machines, and more particularly, the Java virtual machine is described in more detail in *The Java Virtual Machine Specification* by Tim Lindholm and Frank Yellin (ISBN 0-201-63452-X), which is incorporated herein by reference.

Figure 6:
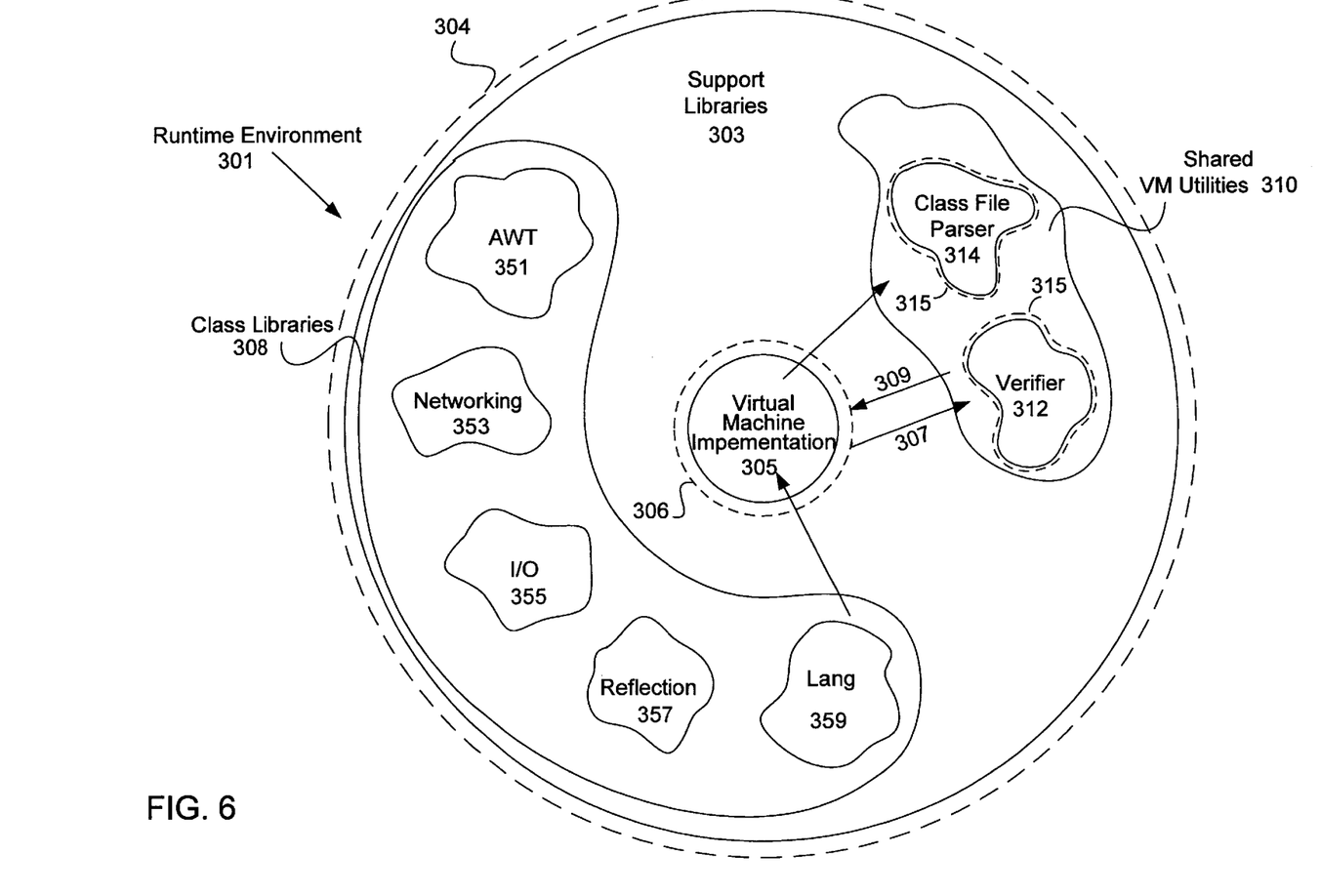
FIG. 6 illustrates an embodiment of a virtual machine implementation in accordance with an embodiment of the present invention.

Referring next to FIG. 6 one embodiment of a runtime environment in accordance with the present invention will be described. The invention will be described in the context of a Java runtime environment, although it should be appreciated that the underlying ideas are not so limited. As shown, the runtime environment 301 includes support libraries 303 and a virtual machine implementation 305. The runtime environment also includes a runtime API 304 that is accessible to external objects.

Support libraries 303 conceptually include both class libraries 308 and shared virtual machine utilities 310. The class libraries 308 generally include methods and native functions used to implement native methods. In a Java runtime environment, the methods are generally written in the Java programming language. Native functions included in support libraries 303 typically provide platform specific functions like I/O, graphical windowing, networking, and the like. In a Java runtime environment, the native functions may be written in any number of different languages and typically are written in a language other than the Java programming language. In the embodiment shown in FIG. 6, the class libraries 308 include Abstract Windowing Toolkit (AWT) classes 351, networking classes 353, I/O classes 355, reflection classes 357 which include functions that provide introspection service for classes, and lang classes 359 which provide primitive utilities such as strings, threads and hash tables.

The shared virtual machine utilities 310 are virtual machine functions that any virtual machine implementation may unambiguously rely on to be present in the support libraries 303 and generally perform services that may be required by a virtual machine implementation. By way of example, the shared virtual machine utilities may include a verifier 312 capable of verifying the correctness of the class. As will be appreciated by those skilled in the art, a verifier can be extremely difficult to write securely and thus by effectively separating the verifier from the virtual machine implementation, it is easier to create a different virtual machine implementation since the verifier does not need to be rewritten as well. The shared virtual machine utilities 310 may also include class file parser 314 which is capable of parsing received classes. Like the verifier 312, the class file parser 314 provides an important service to the virtual machine implementation, but can be difficult to write and thus, by effectively separating the class file parser from the virtual machine implementation, it is easier to create a different virtual machine implementation.

In contrast to the arrangement in the background section with reference to FIG. 5, the virtual machine implementation of FIG. 6 includes a virtual machine binary interface 306 that specifies functions that will generally be supplied by the virtual machine implementation. Conversely, the shared virtual machine utilities such as the verifier 312 and class file parser 314 each include binary library interfaces 315 that may be used by the virtual machine to access their functionality. By specifying the binary interfaces of the virtual machine and specific shared virtual machine utilities 310, a flexible architecture may be provided which permits virtual machine implementations to be exchanged without requiring modification of the supporting libraries.

As will be appreciated by those skilled in the art, conventional virtual machines are arranged to perform a wide variety of functions and thus a large set of virtual machine interface functions must be declared to define the virtual machine interface 306. In order to avoid unnecessary complexity, no effort is made herein to identify all of the interface functions that may be appropriate for a particular virtual machine, however for the purposes of illustration a few representative functions will be described below.

As will be appreciated by those skilled in the art, a number of the functions performed by a particular virtual machine implementation will be implementation specific in that some of their operations will be dependent upon the implementation of the virtual machine. If these functions are accessible to the support libraries 303, then to make virtual machine implementations more readily pluggable it is desirable to define the interfaces for such functions in manners that are not implementation dependent. Thus, the set of virtual machine interface functions preferably execute substantially all operations that are dependent on the implementation of the virtual machine. Most preferably, the set of virtual machine interface functions execute all operations that are dependent on the implementation of the virtual machine. The set of functions that depend on the implementation of the virtual machine may include functions that get the values of fields, get the number of methods within a class, get the signature of a given class, and the like. The set of virtual machine interface functions may also include functions that control the virtual machine. An example of such a function is a virtual machine interface function that instructs the virtual machine to perform garbage collection.

By way of example, one potential virtual machine interface function is a "Get Class Fields Count" function which is arranged to return the number of fields declared in a class. Such a function is generally implemented by the virtual machine in some implementation specific way since the manner in which the information is retrieved will depend at least in part on how the class is stored by a particular virtual machine implementation. More specifically, each implementation of the virtual machine may have a different way of representing a class in memory. For this reason, the Get Class Field Count function may need to know how the class (or objects of the class) is stored in memory. Thus, to provide modularity, the interface to the Get Class Fields Count function is specified in such a way as to abstract details of how a particular virtual machine stores a class so that a function calling the Get Class Fields Count function does not need to know those details, but only the abstractions. Thus the interface to the Get Class Fields Count function forms part of the virtual machine interface 306.

In conventional Java virtual machine implementations, there may not be an equivalent function to the "Get Class Fields Count" function declared in the virtual machine. This is because the libraries are typically written in conjunction with the virtual machine implementation. However, if a developer desires to exchange the virtual machine implementation (e.g., with one that is implemented differently and provides generally faster execution), the developer may need to rewrite many or all of the library functions that relied on assumptions about the implementation of the Java virtual machine. Rewriting library functions is disadvantageous for a number of reasons including the inefficiency of rewriting the functions, reconciling the different virtual machine implementations, and the possibility that the rewritten functions will have errors and need to be debugged.

Referring in combination to FIGS. 4 and 6, a use of such a function will be described in the context of a exemplary situation where the runtime environment 301 is requested to load an application class 203. As described above, the class loader 211 is part of virtual machine implementation 305 and is arranged to make a call to the verifier 312 which is part of shared VM utilities 310 to verify the class as indicated by an arrow 307. The verifier 312 ensures that the class satisfies a set of constraints so that the class will not violate the integrity of the virtual machine.

In order for the class to be verified, the verifier function may in turn call a function that gets the number of fields for a class, as for example the Get Class Fields Count function provided within virtual machine implementation 305 which is accessible through the virtual machine interface 306. The verifier calls Get Class Fields Count function as indicated by an arrow 309 of FIG. 6. As described above, the Get Class Fields Count function, as well as essentially all other functions that execute operations required by the support libraries that are dependent on the implementation of the virtual machine, is provided as part of the virtual machine implementation and are accessible through the virtual machine interface 306. Thus, the verifier 312 does not need or depend on virtual machine implementation details. Rather it relies upon the virtual machine interface 306. At the same time, it should be appreciated that the verifier 312 may be shared by more than one virtual machine implementation. Accordingly, a developer is able to encapsulate the implementation-specific details within the virtual machine.

The overall interface between the virtual machine implementation 305 and the support libraries 303, is a bidirectional interface which generally allows for communication between virtual machine implementation 305 and support libraries 303. Virtual machine implementation 305 typically calls shared virtual machine utilities 310 through a utilities interface 315. Conversely, support libraries 303 typically call virtual machine implementation 305 through virtual machine interface 306. It should be appreciated that in many circumstances, the interface between virtual machine implementation 305 and support libraries 303 may operate in a unidirectional manner. For example, not all calls from virtual machine implementation 305 to shared virtual machine utilities 310 will necessarily result in a return call from shared virtual machine utilities 310 to virtual machine implementation 305, and vice versa. By way of example, virtual machine implementation 305 may call a class file parser 314 that does not make a return call into virtual machine implementation 305. Similarly, a native function defined in one of the class libraries 308 may call a function defined in the virtual machine interface 306 that causes garbage collection to occur. In this situation, the garbage collector within the virtual machine implementation 305 does not make a return call to support libraries 303. It is noted that like the Get Class Field Count function described above, the function that starts the garbage collector on the virtual machine is likely to be dependent on the implementation of the virtual machine.

Using the garbage collection example, a Virtual Machine Garbage Collection function is declared in virtual machine implementation 305 and would start the garbage collector. Thus, when an application wishes to activate garbage collection, the application makes a call to a native method in the class libraries 308 which in turn calls the Virtual Machine Garbage Collection function to start the garbage collector. The garbage collection operation will then be performed by a function declared in virtual machine implementation 305. Therefore, the implementation-specific garbage collector start function is encapsulated in virtual machine implementation 305 through virtual machine interface 306.

Figure 7:
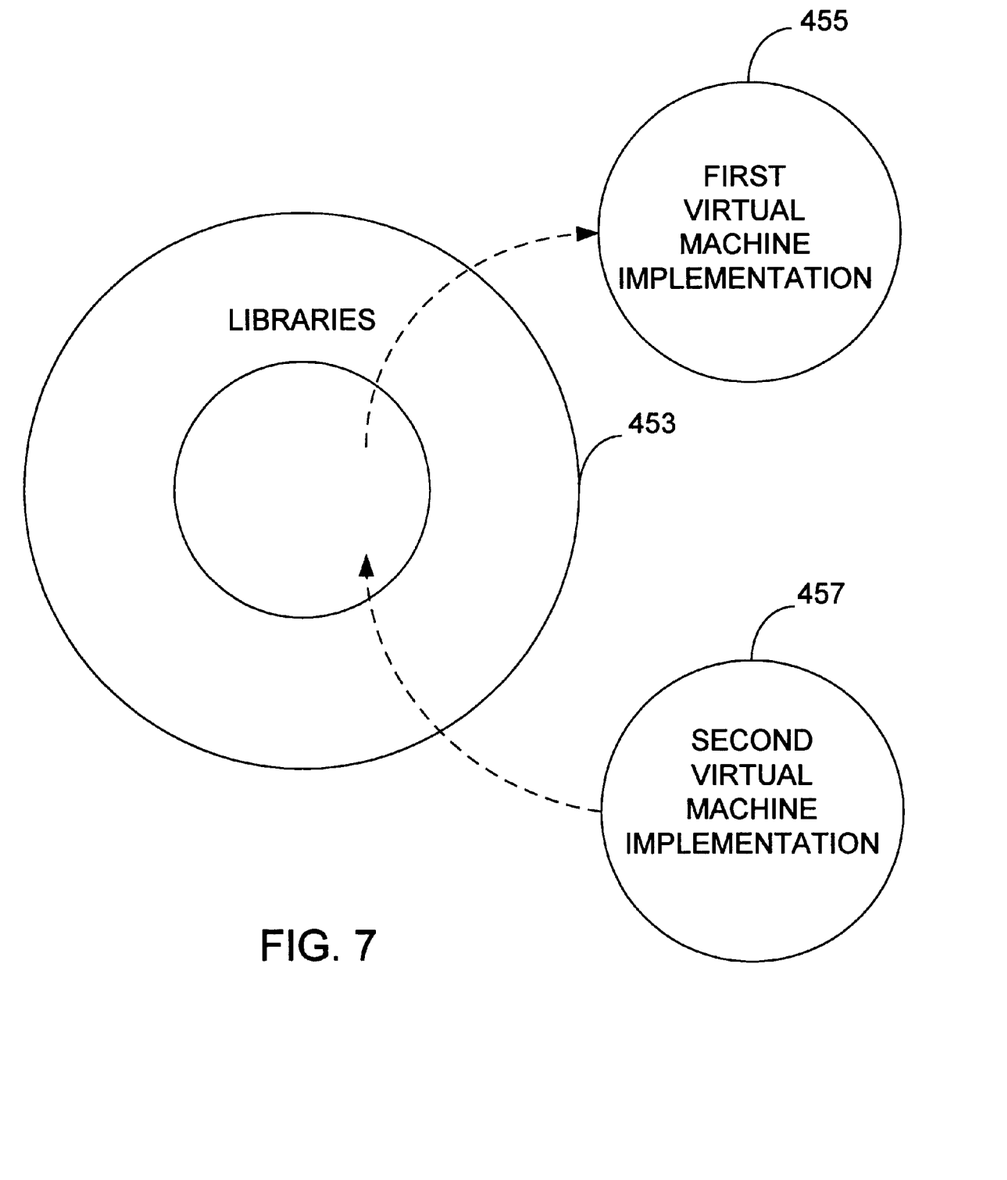
FIG. 7 illustrates conceptually how one Java virtual machine implementation may be exchanged for another in accordance with an embodiment of the present invention.

An advantage of the described architecture is that a developer (or anyone with the capability) may change the virtual machine implementation without a major impact to the support libraries. For example, FIG. 7 illustrates conceptually how one virtual machine implementation may be exchanged for another. Support libraries 453 are shown as described above. A first virtual machine implementation 455 may be exchanged for a second virtual machine implementation 457 by causing the support libraries 453 to call the second virtual machine implementation in place of the first one, and causing the second virtual machine implementation to call the support libraries 453. In some embodiments, the virtual machine implementations may be delivered as DLLs (dynamic link libraries) so a user may simply change the DLL that is utilized. The designations of "first" and "second" are not intended to imply that the invention is limited to virtual machine implementation upgrades. The invention may be advantageously applied to exchanging virtual machine implementations for any number of reasons including the utilization of multiple virtual machine implementations.

When a virtual machine implementation is exchanged for another, the library functions in support libraries 453 may remain substantially unchanged. In preferred embodiments, the libraries remain totally unchanged. Because the virtual machine design encapsulates the functions that are dependent on the implementation of the virtual machine, the libraries are isolated from changes in the virtual machine implementations.

Figure 8:
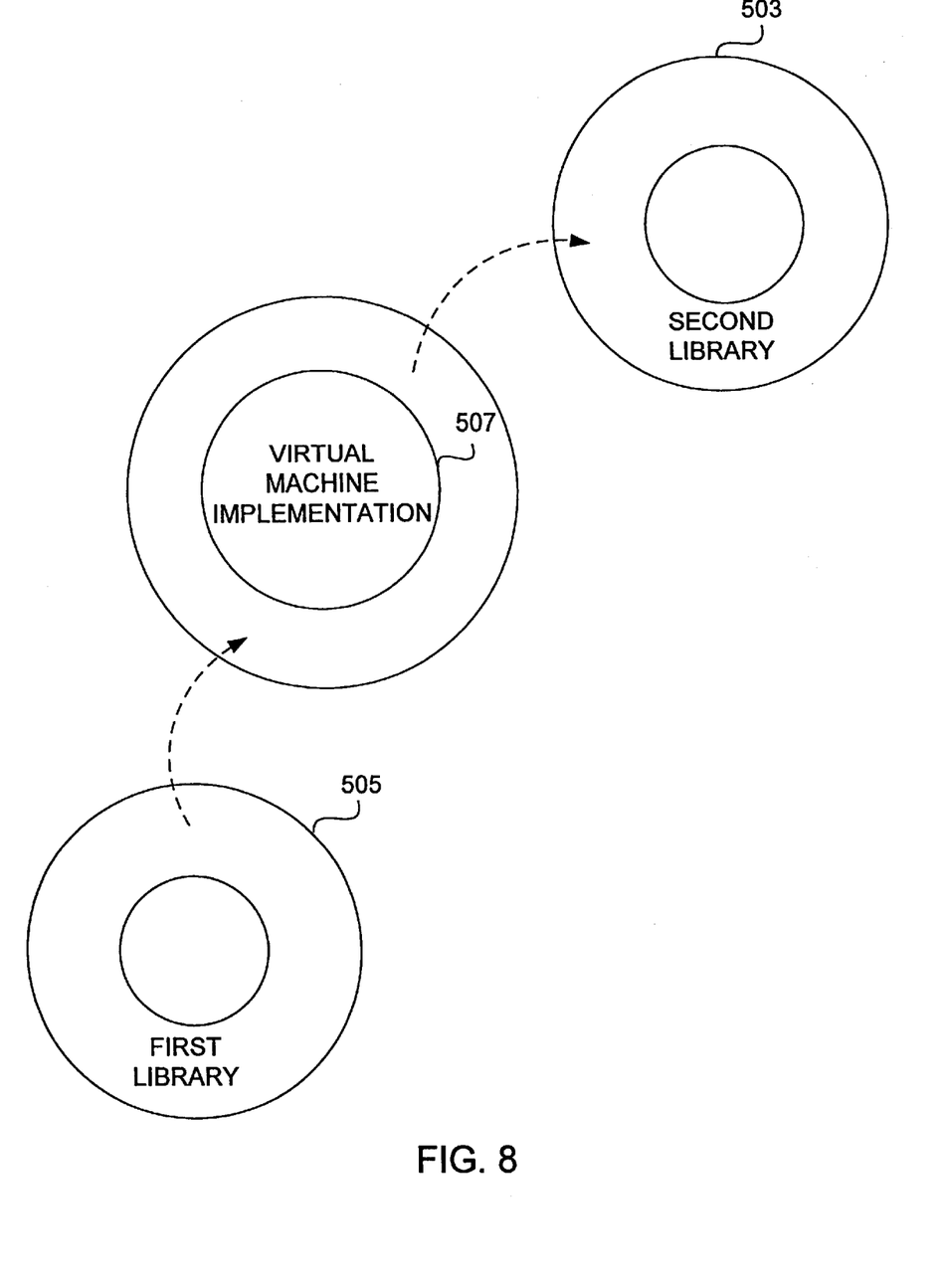
FIG. 8 illustrates conceptually how one library that may be used with a Java virtual machine implementation may be exchanged for another library in accordance with an embodiment of the present invention.

As described above, one advantage of embodiments of the invention is that a developer may exchange virtual machine implementations without significantly impacting the support libraries. Alternatively, a developer may exchange support libraries without causing a significant impact on a virtual machine implementation which uses the support libraries. In other words, one virtual machine implementation may use multiple implementations of support libraries. FIG. 8 illustrates conceptually how an implementation of a support library associated with a virtual machine implementation may be exchanged for another support library.

"A first library implementation 505 may be exchanged for a second library implementation 503 by causing the virtual machine implementation 507 to call the second library implementation 503 in place of the first, and causing second library implementation to call the virtual machine implementation. By way of example, in some embodiments, libraries 503, 505 may be delivered as DLLs such that the user may change the DLL that is utilized. In other embodiments, libraries 503, 505 may be delivered as compiled code (as for example Java code) or combination of compiled Java code and DLLs."

While the above is a complete description of preferred embodiments of the invention, various alternatives, modifications, and equivalents may be used. It should be evident that the invention is equally applicable by making appropriate modifications to the embodiments described above. For example, the embodiments described have been in reference to a Java virtual machine, but the principles of the present invention may be readily applied to other systems and languages. Therefore, the above description should not be taken as limiting the scope of the invention that is defined by the metes and bounds of the appended claims along with their full scope of equivalents.

What is claimed is:

1. A method for developing virtual machine implementations suitable for use in a runtime environment suitable for executing selected code, the method comprising:

providing library functions suitable for use within the runtime environment, wherein at least some of the library functions are arranged to call functions that perform operations required by a virtual machine; and declaring in a first virtual machine implementation, a set of functions for executing substantially all of the virtual machine operations required to provide the virtual machine, wherein the virtual machine operations include substantially all of the operations required by the library functions that are dependent on the first virtual machine implementation.

2. The method of claim 1, further comprising replacing the first virtual machine implementation with a second virtual machine implementation, wherein the library functions may be readily utilized with the second virtual machine implementation.

3. The method of claim 1, wherein at least some of the library functions are called by the functions declared in the first virtual machine implementation.

4. The method of claim 1, wherein the virtual machine operations includes all operations required by the library functions that are dependent on the implementation of the first virtual machine implementation.

5. The method of claim 1, wherein the set of functions includes operations that control the first virtual machine implementation, access data and perform input/output (I/O) operations.

6. The method of claim 2, wherein the first and second virtual machine implementations are Java virtual machine implementations.

7. The method of claim 1, wherein said library functions are first library functions, and further comprising:

providing second library functions that call functions declared in said virtual machine implementation, wherein the second library functions may be readily utilized with said virtual machine implementation.

8. A computer program product for implementing virtual machines suitable for use in a runtime environment suitable for executing selected code, the computer program product being embodied in a computer readable media and comprising:

computer code that perform library functions suitable for use within the runtime environment, wherein at least some of the library functions are arranged to call functions that perform operations required by a virtual machine; and a first virtual machine implementation that performs a set of functions for executing substantially all of the virtual machine operations required to provide the virtual machine, wherein the virtual machine operations include substantially all of the operations required by the library functions that are dependent on the implementation of the first virtual machine.

9. The computer program product of claim 8, wherein the library functions may be readily utilized with a second virtual machine implementation.

10. The computer program product of claim 8, wherein the first and second virtual machine implementations are Java virtual machine implementations.

11. The computer program product of claim 8, wherein the library functions are called by the functions declared in the virtual machine.

12. The computer program product of claim 8, wherein the virtual machine operations include all virtual machine operations required by the library functions that are dependent on the implementation of the virtual machine.

13. The computer program product of claim 8, wherein the set of functions includes operations that control the first virtual machine implementation, access data and perform input/output (I/O) operations.

14. The computer program product of claim 8, wherein the computer readable medium is selected from the group consisting of CD-ROM, floppy disk, tape, flash memory, system memory, hard drive, and data signal embodied in a carrier wave.

15. The computer program product of claim 8, wherein said library functions are first library functions, and further comprising:

computer code that perform second library functions that call functions declared in said virtual machine implementation, wherein the second library functions may be readily utilized with said virtual machine implementation.

16. In a runtime environment comprising library functions that call functions declared in virtual machine implementations to execute operations required of the virtual machine and wherein virtual machine operations which are dependent on how the virtual machine is implemented are specified, a method for developing implementations of a virtual machine, comprising:

declaring in a first virtual machine implementation a set of functions for executing substantially all virtual machine operations required by the library functions that are dependent on the first virtual machine implementation.

17. A virtual machine implementation suitable for use in a runtime environment, the runtime environment having support libraries that include library functions, and a defined virtual machine interface between the support libraries and the virtual machine, the virtual machine interface defining a number of operations that must be performed by the virtual machine implementation, and wherein at least some of the library functions call virtual machine implementation dependent functions that perform operations that are dependent on the particular virtual machine used to perform the operation, and the virtual machine interface being arranged to define substantially all operations that are virtual machine implementation dependant, the virtual machine implementation comprising a set of implementation functions for executing substantially all of the operations defined by the virtual machine interface.

18. The virtual machine implementation as recited in claim 17, wherein the implementation functions include substantially all of the functions called by the runtime environment support libraries that are virtual machine implementation dependent.

19. The virtual machine implementation as recited in claim 17, wherein the virtual machine implementation is suitable for use in conjunction with a plurality of runtime environments that include at least some different support libraries that are arranged to conform to the virtual machine interface.

20. A runtime environment suitable for use in conjunction with at least one virtual machine implementation, the runtime environment including support libraries and a defined virtual machine interface that facilitates communications between the support libraries and the virtual machine implementation, the virtual machine interface defining a number of virtual machine dependent operations that must be performed by the virtual machine implementation; and wherein:

the support libraries include library functions with at least some of the library functions being arranged to call virtual machine implementation dependent functions that perform virtual machine implementation dependent operations; and the virtual machine interface is arranged to define substantially all operations that are virtual machine implementation dependant.

21. A runtime environment as recited in claim 20, wherein the runtime environment is suitable for use in conjunction with a plurality of different virtual machine implementations that are arranged to conform to the virtual machine interface.

* * * * *